United States Patent [19]

Hall et al.

[11] Patent Number: 4,877,856

[45] Date of Patent: Oct. 31, 1989

[54] SOFT THERMOPLASTIC POLYURETHANE FOR BLOWN FILM APPLICATION

[75] Inventors: Dale R. Hall, Avon Lake; Dennis J. Keller, Rocky River, both of Ohio

[73] Assignee: The BF Goodrich Company, Akron, Ohio

[21] Appl. No.: 91,000

[22] Filed: Aug. 31, 1987

[51] Int. Cl.$^4$ .................. C08G 18/38; C08G 18/30
[52] U.S. Cl. .................. 528/44.79; 528/76; 528/80; 528/83
[58] Field of Search .................. 528/79, 83, 76, 80

[56] References Cited

U.S. PATENT DOCUMENTS

| | | |
|---|---|---|
| 2,729,618 | 2/1956 | Mueller, et al. . |
| 2,843,568 | 7/1958 | Benning et al. .................. 528/79 |
| 2,861,972 | 11/1958 | Muller et al. .................. 528/83 |
| 2,871,218 | 1/1959 | Schollenberger . |
| 2,901,467 | 8/1959 | Croco . |
| 3,001,971 | 9/1961 | Scott et al. . |
| 3,012,992 | 12/1961 | Pigott et al. . |
| 3,016,364 | 1/1962 | Mueller . |
| 3,422,066 | 1/1969 | Britain . |
| 3,577,385 | 5/1971 | Feltzin et al. . |
| 4,255,552 | 3/1981 | Schollenberger et al. .................. 528/50 |
| 4,284,750 | 8/1981 | Amirsakis .................. 528/79 |

FOREIGN PATENT DOCUMENTS 0206619 12/1983 Japan .................. 528/83

1149771 8/1966 United Kingdom .................. 528/79

Primary Examiner—Morton Foelak
Assistant Examiner—Dennis R. Daley
Attorney, Agent, or Firm—Louis F. Kreek, Jr.; Debra L. Pawl

[57] ABSTRACT

Soft linear thermoplastic polyurethanes, which have low permanent set, high tear propagation resistance, and low blocking, and which are extrudable by blown film techniques, are prepared by reacting one mole of a hydroxyl terminated polyester having a molecular weight from about 1800 to about 3600, from about 0.5 to about 2.0 moles of an aromatic glycol chain extender, and an organic diisocyanate in molar quantities substantially equal to the sum of the molar quantities of polyester and chain extender. The polyester is a mixed polyester prepared by reacting at least two different aliphatic glycols with one or more organic dicarboxylic acids or at least one alaphatic glycol with two or more organic dicarboxylic acids. The aliphatic glycol may have from 2 to about 10 carbon atoms. The organic dicarboxylic acid may be either aliphatic or aromatic and may have from 2 to about 12 carbon atoms. The preferred chain extender is hydroquinone bis(beta-hydroxyethyl)ether. Polymers of this invention are useful as elastic tapes, and in particular as leg bands in diapers and adult incontinence garments. They may be used for other items of form-fitting apparel, such as ladies swim suits.

18 Claims, No Drawings

SOFT THERMOPLASTIC POLYURETHANE FOR BLOWN FILM APPLICATION

TECHNICAL FIELD

This invention relates to thermoplastic polyurethane and more particularly to soft linear thermoplastic polyurethane elastomers which are extrudable by blown film techniques.

BACKGROUND ART

Certain thermoplastic polyurethanes may be processed by blown film techniques, in which a thin tube or "bubble" of polyurethane is most normally extruded upwardly and collapsed by nip rolls at the top of the film tower in which extrusion takes place. Conventional thermoplastic polyurethanes, processed by blown film techniques, are typically highly lubricated to avoid self adhesion (blocking) when the extruded tube is collapsed at the nip rolls, which bring the two thicknesses of plies of the film together. To further reduce the tendency to block, particulate diatomaceous earth is sometimes added to self emboss the blown film surface, thus further reducing contact between the layers. The softer and more elastic the polyurethane, the more surface modification needed. For example, conventional polyurethanes having a Durometer A hardness of 85 and based on 1000 MW polyether or polyester macroglycols require 2 or more parts of wax per 100 parts of polyurethane to avoid blocking.

Certain surface modifying additives are notably undesirable in end use applications requiring subsequent adhesion of the blown film to other materials. An example would be disposable diapers wherein blown polyurethane film is put into strips and adhered to the leg area with a melt adhesive. At high line speeds, excessive surface wax can interfere with adhesion.

U.S. Pat. No. 2,871,218 to Schollenberger illustrates a conventional thermoplastic polyurethane elastomer which can be extruded by blown film techniques. The polyurethanes therein disclosed require a high degree of lubrication, e.g. with 2 to 5 parts of wax per 100 parts of polyurethane, in order to avoid blocking. Linear polyurethane elastomers described in this patent are formed by reacting 1.0 mole of a polyester having molecular weight of 600–1200 with about 0.1 to 2.1 moles of a free glycol containing 4 to 10 carbon atoms and 1.1 to 3.1 moles of a diphenyl diisocyanate, wherein the moles of diisocyanate are equal to the sum of the moles of polyester and free glycol. The polyester is a linear hydroxyl terminated polyester formed by the reaction of a straight chain aliphatic glycol containing some 4 to 10 carbon atoms, such as 1,4-butanediol, with an aliphatic dicarboxylic acid containing from 4 to 10 carbon atoms, such as adipic acid. The free glycol chain extender is also preferably 1,4-butanediol, and more broadly may be an aliphatic-glycol containing from 4 to 10 carbon atoms. While the polyurethane elastomers formed according to this invention have satisfactory tensile strength, high elongation and satisfactory modulus, they do have the tendency to block unless highly lubricated, as already noted.

U.S. Pat. No. 3,001,971 to Scott et al describes another series of thermoplastic polyurethanes which are prepared from a hydroxyl terminated aliphatic polyester, an alkoxydiol and an aromatic diisocyanate in which the —NCO/—OH equivalent ratio is essentially 1:1. Preferred polyesters are as in Schollenberger discussed above, and the preferred alkoxydiol (which serves as chain extender) is 1,4-di(2-hydroxyethyoxy)benzene.

U.S. Pat. No. 3,422,066 to Britain describes a process in which polyurethane fiber or thread having hard and soft segments is prepared by reacting a mixed hydroxyl terminated polyester and a mixture of glycol chain extenders with an excess of organic diisocyanate. The polyester has a molecular weight from 600 to 5000 and is prepared by reacting a mixture of at least 2 saturated aliphatic glycols with a dicarboxylic acid. The chain extender is a mixture of an aromatic glycol, such as 1,4-di(2-hydroxyethoxy)benzene and a straight chain aliphatic glycol.

Also disclosing preparation of a polyurethane elastomer by reaction of a hydroxyl terminated polyester with a chain extender using an excess of organic diisocyanate in U.S. Pat. No. 3,012,992 to Pigott et al. In this case the polyester may be obtained from one dihydric alcohol and one dicarboxylic acid or a mixture thereof. The chain extender or cross linking agent is preferably 1,4-di(2-hydroxyethoxy)benzene. The polyurethane elastomers of this patent are disclosed as being useful in load bearing applications.

The patents cited above are representative of the state of the art on thermoplastic polyurethane elastomers, but this list is by no means exhaustive. It is apparent that physical properties of the products vary widely depending on the specific reactant materials used and the proportions thereof.

Blocking resistance at low lubricant levels, low permanent set after stretching and moderate to high tear propagation resistance are highly desirable properties in any polyurethane elastomer which is to be extruded via blown film technique for elastic tape application. Any two of these three properties can be satisfied by a number of thermoplastic polyurethane compositions. However, it has not been possible to satisfy all three characterists prior to the present invention without resorting to excessive quantities of lubricant, which has the disadvantage noted above with regard to high speed processing.

DISCLOSURE OF THE INVENTION

This invention according to one aspect thereof provides novel polyester urethane elastomers, which are reaction products of (a) a hydroxyl terminated polyester of the formula (I)

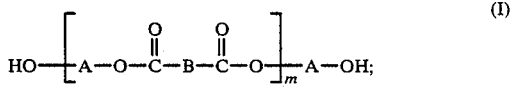

(b) a chain extender of the formula (II)

HO—Y—OH        (II);

and (c) an isocyanate of the formula (III)

OCN—Z—NCO        (III);

wherein:

(1) A is an alkylene or oxydialkylene radical containing from 2 to about 10 carbon atoms or a mixture thereof, and B is an alkylene radical containing from 2 to about 10 carbon atoms or an arylene radical containing from 6 to about 12 carbon atoms or a mixture thereof, with the proviso that at least one of A or B is a mixture, Y is a phenylenedialkylene or phenylenedioxyalkylene radical containing from 8 to about 14 carbon atoms, and Z is a divalent organic radical;

(2) said polyester has a molecular weight of about 1800 to about 3600;

(3) the molar ratio of said chain extender to said polyester is at least about 0.5, and (4) the molar quantity of said isocyanate is substantially equal to the sum of the molar quantities of said polyester and said chain extender.

This invention according to another aspect provides a polymer composition comprising 100 parts by weight of a thermoplastic polyurethane elastomer, and not more than 1.75 parts by weight of a lubricant, which can be a wax or mixture of waxes as will be described hereinafter in greater detail.

Both the thermoplastic polyurethane elastomers and the polymer compositions described above are relatively soft materials, having low permanent set, high tear propagation resistance and high extensibility (i.e. high elongation at break). The polymer compositions are also essentially non-blocking. The polymer compositions can be extruded by blown film techniques and slit to form elastic tapes, which in turn can be laminated to garments at those portions thereof (such as the leg openings of a lady's swim suit, a diaper or an incontinence garment) which must conform closely to the body of the wearer.

BEST MODE FOR CARRYING OUT THE INVENTION

Thermoplastic polyesterurethane elastomers of this invention are composed of alternating hard and soft segments. The hard segments consist essentially of repeating units of the formula (IV)

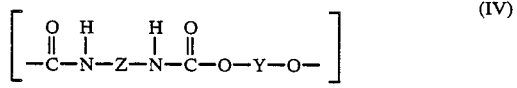

wherein Y and Z are as defined above. The average number of repeating units in a hard segment is n, where n is the molar ratio of chain extender to hydroxyl terminated polyester. The soft segments consist essentially of repeating units of the formula (V),

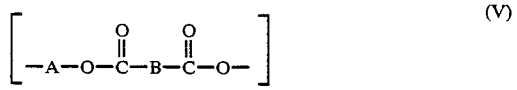

wherein A and B are as defined above. The average number of repeating units in a soft segment is m, wherein m has a value such that the number average molecular weight is from about 1600 to about 3600. The symbols A, B, Y, Z, m and n shall have the above respective meanings throughout the specification and claims.

The hard segments constitute a variable percentage of the total polymer depending on m, n and Y. These hard segments are crystalline at ambient temperatures, and show a diffuse crystalline melting transition having a maximum melting temperature (Tmm) typically from about 170° to about 200° C. The soft segments are essentially amorphous at ambient temperatures, typically having a glass transition from about −25° to about −40° C. There is a marked degree of phase separation between the hard and soft segments, as is desirable in order to achieve the unique combination of blocking resistance, low permanent set, and moderate to high tear propagation resistance which characterizes polymers of this invention.

The soft segment macroglycol, or hydroxyl terminated polyester, is a random mixed hydroxyl terminated polyester having a molecular weight in the range of about 1800 to about 3600 and formed by the reaction of at least 3 monomers, i.e. at least 2 aliphatic glycols and at least 1 dicarboxylic acid, or at least 1 aliphatic glycol and at least 2 dicarboxylic acids. The preferred glycols are the alkanediols and dihydroxydialkyl ethers (i.e. oxydialkanols), in particular the straight chain alkanediols and dihydroxydialkyl ethers containing from 2 to about 10 carbon atoms. Representative diols are ethylene glycol, diethylene glycol, 1,3-propanediol, 1,3-butanediol, 1,4-butanediol, 1,5-pentanediol, 2,2-dimethyl-1,3-propanediol, 1,6-hexanediol, 1,8-octanediol, and 1,10-dodecanediol. Suitable dicarboxylic acids are aliphatic dicarboxylic acids containing from 2 to about 12 carbon atoms. Representative dicarboxylic acids are succinic acid, glutaric acid, adipic acid, suberic acid, sebacic acid, phthalic acid, iso-phthalic acid, and terephthalic acid. Whether a mixture of glycols and a single dicarboxylic acid, or a single glycol and a mixture of dicarboxylic acids is used to prepare the macroglycol, the molar ratio of glycols (or acids) in the mixture should range from 90:10 to 10:90. Preferred monomer reactant mixtures are those containing 2 glycols and 1 acid. In particular, monomer mixture of 1,4-butanediol and 1,6-hexanediol in equal molar amounts or ethylene glycol and 1,6-hexanediol in a molar ratio of 1:2 when reacted with adipic acid are preferred. A molar excess of glycol, varying inversely with the desired polyester molecular weight, is charged to achieve a hydroxyl terminated polyester, as is well known in the art.

The chain extender is a dihydroxyalkylbenzene or dihydroxyalkoxybenzene compound of the general formula (II)

wherein Y is phenylenedialkylene or phenylenedioxyalkylene radical containing from 8 to about 14 carbon atoms. In other words, the radical Y may be represented by formula (VI) as follows:

wherein Ph is a phenylene radical, Alk is an alkylene radical containing from 1 to about 4 carbon atoms, and W is a linking bond or an oxygen atom. Preferred chain extenders are those in which Ph is the 1,4-phenylene radical and W is an oxygen atom. Representative chain extenders include hydroquinone bis(beta-hydroxyethyl)ether, [also known as 1,4-di(2-hydroxyethoxy)benzene]; resorcinol bis(beta-hydroxyethyl)ether [also known as 1,3-di(2-hydroxyethyl)benzene]; catechol bis(beta-hydroxyethyl)ether, ]also known as 1,2-di(2-hydroxyethoxy)benzene]; and xylylene glycols which is a mixture of 1,4-di(hydroxymethyl)benzene and 1,2-di(-hydroxymethyl)benzene. The preferred chain extender is hydroquinone bis(beta-hydroxyethyl)ether.

A small amount of adventitious chain extender, in the form of unreacted free alkanediol or oxydialkylenediol associated with the polyester macroglycol, is charged to the polyurethane reaction. The amount of such free diol is typically about 0.25 to about 0.75 percent of the polyester macroglycol weight.

The organic diisocyanate reactant may be 4,4'-diphenylmethane diisocyanate (MDI); 1,5-naphthalene diisocyanate; meta-phenylene diisocyanate or para-phenylene diisocyanate. However, the preferred diisocyanate is 4,4'-diphenylmethane diisocyanate (MDI). Not all organic diisocyanates are suitable for making the thermoplastic polyurethanes of this invention. For example, TDI, which is predominantly toluene 2,4-diisocyanate, is not suitable. Suitable aromatic diisocyanates for preparing thermoplastic polyesterurethanes are recognized in the art; see for example U.S. Pat. No. 3,422,066.

Reactants having functionality higher than 2, as for example triols and triisocyanates, are not used in the preparation of either the thermoplastic polyurethanes of this invention or the polyester precursors, since the desired thermoplastic polyurethanes of this invention are linear and not cross-linked. Reactants having functionality higher than 2 are undesirable even if present as minor impurities.

The molar ratio of chain extender to macroglycol should be in excess of about 0.5 and not over 3.0. Preferably, the molar ratio is from about 0.75 to about 2.0, and most preferably from about 1.0 to about 2.0.

The equivalent ratio of isocyanate groups to hydroxyl groups, which is the same as the molar ratio of diisocyanate to combined amounts of macroglycol and chain extender, should be close to 1.00, i.e. from about 0.98 to about 1.03. Significant excesses of either hydroxyl compound (macroglycol and chain extender) or isocyanate should be avoided. Linear polyurethanes containing any significant excess of isocyanate will in time undergo allophanate cross-linking reaction, which, while reversible, is detrimental to subsequent extrusion processing. The molecular weight of the product depends on the —NCO/—OH equivalent ratio, and reaches a maximum for random melt polymerized "greenstock" (product quenched to room temperature within minutes after the polymerization exotherm has reached maximum temperature) when this ratio is 1.00. Higher molecular weight is attainable by reacting away excess isocyanate at 60° to 140° C. via both linear polymerization and the above noted cross-linking reaction; however, a ratio of 1.02 is a practical maximum for acceptable extrusion processing. In general, products having high linear molecular weight as indicated by an ASTM D1238 melt index flow rate of 20 to 50 grams per 10 minutes at 210 degrees Centrigrade and 3800 grams loading, are preferred. These products may be obtained by using an —NCO/—OH equivalent ratio from about 0.99 to about 1.02.

Thermoplastic polyurethanes of this invention may be made in either a one-step process or a two-step process, which can be either batch or continuous. A one-step random melt polymerization process is preferred. That is, the macroglycol, the chain extender, and catalyst, dried to a moisture content of 0.05 percent maximum, are preblended and preheated and charged to a thermally jacketed reactor along with preheated diisocyanate in stoichiometrically equivalent proportions. Known polyurethane synthesis catalysts such as stannous octoate or dibutyltin dilaurate may be used. Typically the reactants will be combined at a temperature from about 110° to about 140° C., e.g., at about 130° C. and will undergo an exothermic increase in temperature to about 240° C. over the course of the next several minutes. The amount of exothermic temperature increase (or exotherm) depends on the amount of diisocyanate, as is well known. This product "greenstock" is then shaped into sheet or strand and quench cooled, whereupon it is cut into granules for subsequent aging at 60° to 140° C. until the residual isocyanate content is essentially nil. Aging may take 1 hour to 6 days depending on the temperature and level of catalyst employed.

A small amount of wax, i.e. from about 0.5 to about 1.75 phr (i.e. parts by weight of wax per 100 parts of reactants) may be included in the reactant mixture to act as a lubricant to reduce tackiness in the "greenstock" during aging and also to eliminate any tendency to block during subsequent blown film extrusion processing. Amounts of 0.75 to 1.50 phr of wax are especially preferred. A preferred wax is N,N'-distearyl-4,4'-diaminodiphenylmethane. Alternatively, wax may be added from masterbatch at the blown film extruder, in which case the wax requirement can be somewhat less depending on the mixing efficiency of the extruder.

Additionally, small amounts of other additives, may be present. For example from about 0.25 to about 0.75 phr of an antioxidant and from about 0.25 to about 0.75 phr of an ultraviolet radiation stabilizer may be added to the reactant mixture for environmental protection; from about 1 to about 4 phr diatomaceous earth may be added to the reactant mixture to reduce the coefficient of friction of the product film; and from about 0.02 to about 5 phr of pigment may be added for product coloration or brightening.

Alternatively but not preferably, thermoplastic polyurethanes of this invention may be formed in a two-step process. In a representative two-step process, the entire quantities of hydroxyl terminated polyester and diisocyanate are charged to the reactor in a first step and reacted to form an isocyanate terminated prepolymer. Then the chain extender is added and reacted with the prepolymer under conditions forming a thermoplastic polyurethane (i.e., non-cross-linking conditions). Reactant ratios are the same as in the one-step process. Moisture-free reactants and reaction conditions are required, as in the one-step process.

A granular form of the product is melt extruded, preferably upwardly, into a thin annular inflated sheet (film tube) which is air cooled under slight biaxial tension as it is pulled upwardly by two nip rolls according to conventional blown film techniques. Ordinarily the distance between the extrusion die and the nip rolls is such that the sheet or tube requires about 20 to 30 seconds to tranverse this distance. The thermoplastic polyurethanes of this invention are capable of re-crystallizing to attain complete blocking resistance within this 20–30 second period before layer to layer contact with the aid of no more than the above noted 0.5 to 1.75 phr of lubricant.

The extruded and flattened film may be slit longitudinally, using slitting machinery and techniques known in the art, in order to obtain strips of film (elastic tape) according to this invention. These strips may be laminated or joined to woven or non-woven fabric garments, particularly at the edges or other portions thereof which must adhere closely to the body of the wearer, by conventional means, e.g. by the use of hot melt adhesives. For example, strips of thermoplastic polyurethane film of this invention may be laminated to ladies' swim suits, baby diapers, and incontinence garments for adults, at the leg openings thereof. Since the polymers of this invention have high elongation with very low permanent set, they are ideally suited for this purpose.

Thermoplastic polyurethane compositions of this invention have low inherent tendency toward blocking, low permanent set and moderate to high tear propagation resistance. As far as applicants are aware, the compositions of this invention are the first thermoplastic polyurethanes to achieve this balance of properties. In addition, polymers of this invention have high extensibility (or elongation), comparatively low 100 percent modulus and relatively low inherent stress/strain anisotropy in blown film form. The modulus at 100 percent elongation is from 350 to 700 psi.

Low inherent tendency toward blocking is a major advantage of compositions of this invention. While there remains some slight tendency for adjacent layers of extruded film according to this invention to stick together or block, this tendency is much less than in thermoplastic polyurethane films made in the same manner and having the same composition except for the use of an aliphatic chain extender or mixture of chain extenders instead of the single aromatic glycol chain extender used herein. Compositions of this invention in film form have simulated blocking or self-adhesion at 135° C. of not over 10 pounds per linear inch (pli) without lubricant added. The simulated blocking test will be described in greater detail subsequently.

Low permanent set is another major advantage of products of this invention. Permanent set is must less in films made according to this invention than in thermoplastic polyurethane films prepared from polyester macroglycols of regular (i.e. made from one glycol and one acid) rather than mixed composition, or prepared from an aliphatic chain extender or mixture of chain extenders rather than the single aromatic glycol chain extender used herein. In particular, products of this invention have an initial set of no more than 25 percent after 200 percent extension, and a permanent set of no more than 15 percent after 200 percent extension as measured by a modified ASTM tensile test method to be described hereinafter. While initial set and permanent set are related properties and used somewhat interchangeably, initial set is the more difficult to achieve and hence the most critical test of a new composition. Also, initial set is more easily measured than permanent set. A major advantage to low permanent set upon elongation is that a strip of the product film may be stretched considerably, as for example, when the leg openings of a garment are stretched in the process of putting the garment on the wearer, without losing tightness of fit.

Compositions of this invention also have moderate to high tear propagation resistance of greater than 150 pounds per linear inch. Tear propagation resistance is the resistance of a material to a tear which has already been initiated. Moderate to high tear propagation resistance is essential in both fabrication and consumer use, since strips or tapes of this invention may have small nicks along the slit edge due to imperfections in the rotary knife or other slitter used. Since the film is under tension in both fabrication and use, transverse tears would tend to propagate from these nicks if the material did not have moderate to high tear propagation resistance.

Compositions of this invention also have a high degree of extensibility. Elongation at break is above 450 percent in all instances, and in many instances exceeds 600 percent. This property is advantageous because it permits garments having bands or strips of the invention composition to be stretched considerably at the site of the strip without breaking.

Compositions of this invention also have a comparatively low isotropic tensile modulus (tensile strength at a stated elongation) values, typically in the range of about 400 to about 600 pounds per square inch at 100 percent elongation and 600 to 1000 pounds per square inch at 300 percent elongation. Low tensile modulus values are desirable because they allow the elastic tape to be made wider for a better seal while still permitting the person wearing the garment to stretch as needed with comparatively little physical effort. In addition, compositions of this invention exhibit low inherent tensile anisotropy in blown film processing due to their relatively high rate of re-crystallization from the melt. As a result, stretching characteristics are only minimally influenced by processing conditions or history.

Durometer A hardness of compositions of this invention is from 68 to 84.

EXAMPLES

This invention will now be described further with reference to specific embodiments thereof, as illustrated in the examples which follow.

ABBREVIATIONS

Abbreviations used in the examples are as follows:

Materials

MG = macroglycol
C4 = 1,4-butanediol
C6 = (referring to alkanediol) = 1,6-hexanediol
C6 = (referring to acid) = adipic acid
C46 = equimolar mixture of 1,4-butanediol and 1,6-hexanediol
CE = chain extender
BG = benzene glycol [i.e. hydroquinone bis(beta-hydroxyethyl)ether]
TPU = thermoplaster polyurethane CL Other
Tg = soft segment glass transition temperature
Tmm = hard segment maximum melting temperature (high end of crystalline melting transtion)

Physical Tests

Melt Index—ASTM D1238 at 210° C. and 3800 g loading.

Blocking (simulation)—Polymer is compression molded into 30 mil sheet and aged 72 hours. Strips 1" by 6" are die cut. The strips are folded back on themselves and weighed down over a 1" by 2" area with a 1 pound steel block. They are aged at constant temperature at 135° C. for 1 hour under a constant ½ psi pressure. At the end of 1 hour the specimens are cooled to room temperature and aged 1 hour. The loop ends are cut and pulled apart at a rate of 20 inches per minute in a tensile tester to determine 180 degree peel strength in pounds per lineal inch (blocking).

Blocking (blown film)—Polymer granules are melt extruded upwardly at a rate of 10 lbs./hr. on a ½ inch laboratory extruder feeding a 2 inch diameter blown film die equipped with air cooling. The film bubble is inflated with air pressure to 3.5 times die diameter, and the nip roll height is adjusted to give 30 seconds elapsed time from die to nip roll with minimum drawdown. The two ply collapsed bubble is sampled and cut transverse to machine direction. Adhesive tape is applied to each side of the collapsed bubble, and ability to part the layers is evaluated in terms of blocking or no blocking.

Tg and Tm—These values are determined on a differential scanning calorimeter (DSC) via second heat analysis using a 10 mg specimen. The specimen is programmed from −100° C. to 250° C. at 10° C. per minute (1st heat) to erase previous thermal history. The specimen is then cooled to −100° C. at the same rate, and reheated to 250° C. at 10° C. per minute (2nd heat).

Stress-Strain—ASTM D412 at 20 inches/minute. Set—A test specimen is prepared, mounted in a testing machine and elongated at 20 inches/minute to 200 percent extension in accordance with ASTM D412. The mounts with the test specimen in place are returned to their original position (zero extension) at 20 inches/minute. Initial set (cycle 1) is read as the zero stress intercept on the return leg of the stress/strain curve, which is in the shape of a hysteris loop. When the machine reaches zero extension, its direction is reversed and a second elongation/return cycle is carried out in the same manner as the first. Initial set (cycle 2) is read as the extension (or percentage elongation) at which stress is first observed. Permanent set is measured as the percentage elongation of a test speciment after one complete elongation/return cycle followed by one additional minute of relaxation.

Tear Propagation—ASTM D1938 at 20 inches/minute.

EXAMPLE 1

This example illustrates the advantages of using hydroquinone bis(beta-hydroxyethyl)ether instead of an alkanediol as the chain extender.

Test and control runs (one each) were carried out according to the example.

The test composition was prepared as follows:

A hydroxyl terminated polyester having a molecular weight of 3000 was prepared by the reaction of adipic acid with a mixture of equimolar quantities of 1,4-butanediol and 1,6-hexanediol, the overall diol/acid molar ratio being 1.07. The reactants were changed to a reactor under dry nitrogen blanket, and held at 125° C. under atmospheric pressure until the initial waters of condensation ceased to be evolved. Vacuum was then applied with increasing temperature, and 15 ppm stannous chloride catalysis as necessary, and additional waters of condensation removed until the hydroxyl number was reduced to 36 and the acid number to less than 0.8, whereupon the reaction product was cooled and recovered.

The polyester thus obtained was then blended with hydroquinone bis(beta-hydroxyethyl)ether in the molar ratio of 1:1.66 to obtain a blend having a molecular weight of 1250. This blend was heated to 140° C. and charged to a reactor along with an equimolar quantity of 4,4'-diphenylmethane diisocyanate which had been heated to 120° C. Also charged to the reactor were 150 ppm of stannous octoate (catalyst) and 1 phr of a wax mixture consisting of N,N'-distearyl-4,4'-diaminodiphenylmethane, the ethylene glycol ester of montan wax acids, and N,N'-ethylene bis-stearamide in a weight ratio of 4:3:1. The charge was thoroughly mixed and allowed to react exothermically for 5 minutes, whereupon it was cooled to room temperature, recovered, granulated and aged for 6 days at 60° C. The melt index and residual isocyanate content of the resulting polyurethane were as shown in TABLE I below.

Granulated reaction product thermoplastic polyurethane was melt extruded upwardly through an annular blown film die to form a thin film bubble. This film was drawn upwardly through nip rolls at a rate such that the film required 30 seconds to pass from the extrusion die to the nip rolls. The film bubble was flattened in the nip rolls, and thereafter was slit longitudinally.

The control was carried out in the same way, except that the chain extruder was 1,4-butanediol, no catalyst was used, and the molar ratio of hydroxyl terminated polyester to chain extender and blend molecular weight were adjusted to 1:2.2 and 1000, respectively, to yield a thermoplastic polyurethane of similar modulus and hardness.

Samples of both test and control compositions (taken prior to extrusion) were physically tested according to the test method described above. Results are shown in TABLE I below.

TABLE I

Physical and Blown Film Property Comparisons

| | Test | Control |
|---|---|---|
| Composition | | |
| Macroglycol (MG) | | |
| Alkanediol(s) | C46 | C-46 |
| Dicarboxylic acid | C6 | C6 |
| Mol. wt. | 3000 | 3000 |
| Thermoplastic polyurethane (TPU) | | |
| Chain extender (CE) | BG | C4 |
| CE/MG molar ratio | 1.66 | 2.20 |
| Blend mol wt. | 1250 | 1000 |
| NCO/OH equivalent ratio | 1.00 | 1.00 |
| % Nitrogen | 1.87 | 2.24 |
| Residual NCO, % | 0.02 | 0.00 |
| Physical Properties | | |
| Melt index (g/10 min, 210C & 3800 g) | 78 | 35 |
| Hardness (Durometer A) | 72 | 70 |
| Transition Temperatures, °C. | | |
| Soft Segment Tg | −42 | −32 |
| Hard Segment Tmm | 197 | 160 |
| Tensile Strength | | |
| 100% Modulus, psi | 515 | 385 |
| 300% Modulus, psi | 865 | 590 |
| Ultimate, psi | 2650 | 4700 |
| Ultimate Elongation, % | 600 | 690 |
| Tear Propoagation Resistance, pli | 179 | 235 |
| 200% Initial Set (C1/C2), % | 19/17 | 20/18 |
| Blocking | | |
| 135C Simulation, pli | 0.6 | 16.3 |
| Blown Film, yes/no | No | Yes |

The test run showed no tendency to block in actual blown film evaluation, despite its elevated melt index (lower molecular weight), whereas the control blocked completely. An additional 2 phr of wax added at the film extruder from masterbatch was required to render the control free from blocking. This shows that hydroquinone bis-beta-hydroxyethyl)ether is markedly superior to 1,4-butanediol as a chain extender in an otherwise similr thermoplastic polyurethane.

EXAMPLE 2

This example further illustrates the different mechanical properties obtained by using hydroquinone bis(beta-hydroxyethyl)ether, 1,4-butanediol and various mixtures thereof in the preparation of otherwise similar thermoplastic polyurethanes.

A macroglycol, which was a mixed tetramethylene-/hexamethylene (equimolar quantities) adipate polyester having a molecular weight of 2500, was prepared by reacting equimolar quantities of 1,4-butanediol and 1,6-hexanediol with adipic acid, the overall diol to acid molar ratio being 1.10, under the conditions specified in Example 1.

The resulting macroglycol, a chain extender, and 4,4'-diphenyl methane diisocyanate were reacted in the presence of a catalyst and in proportions shown in TABLE II below. No lubricant was added. The chain extender was either hydroquinone bis(beta-hydroxyethyl)ether, 1,4-butanediol or a mixture thereof as indicated in TABLE II. The proportions shown in TABLE II, runs 2 and 3, (the two runs using mixed chain extenders) are molar proportions. Reaction conditions were as stated in Example 1. The product was recovered and formed into sheets approximately 0.030 inches thick for testing. Test results are shown in TABLE II below.

from which the thermoplastic polyurethane product is prepared.

A mixed tetramethylene/hexamethylene adipate polyester glycol having a molecular weight of 2500 was prepared under the reaction conditions of Example 1. This mixed polyester, hydroquinone bis(beta-hydroxyethyl)ether and 4,4'-diphenylmethane diisocyanate were reacted in the presence of a catalyst and in the proportions shown in TABLE III below under the reaction conditions of Example 1. The products of these runs had different melt indexes, indicative of different molecular weights, which were achieved by slight variations in the NCO/OH equivalent ratio.

Comparison thermoplastic polyurethanes were prepared as follows:

A tetramethylene adipate polyester glycol having a molecular weight of 2500 was prepared by reaction of 1,4-butanediol with adipic acid under the conditions described in Example 2. This polyester glycol, hydro-

TABLE II

Thermoplastic Polyurethanes Prepared From 2500 MW
Polytetramethylene/hexamethylene (50/50 molar) Adipate

| Run | BG/C4 | MR | MI | Dur | Tg/Tmm | Tensile 100% | 300% | Ult. | % Elg | Set | Trp | 135 B1 |
|---|---|---|---|---|---|---|---|---|---|---|---|---|
| 1 | 100/0 | 1.44 | 29 | 77A | −32/187 | 530 | 845 | 3850 | 550 | 16/15 | 206 | 4.6 |
| 2 | 80/20 | 1.54 | 33 | 74A | −29/170 | 480 | 765 | 4600 | 500 | 13/12 | 159 | 14.0 |
| 3 | 50/50 | 1.69 | 32 | 73A | −26/150 | 405 | 760 | 5500 | 490 | 11/11 | 136 | 15.6 |
| 4 | 0/100 | 1.94 | 35 | 76A | −34/170 | 475 | 750 | 5600 | 520 | 18/17 | 247 | 17.2 |

Abbreviations above:
MR = Molar ratio of chain extender to macroglycol
MI = Melt index (g/10 min at 210C and 3800 g conditions)
Dur = Durometer A hardness
100% = 100% modulus, psi
300% = 300% modulus, psi
Ult = Ultimate tensile strength, psi
Set = Initial extension set, cycle 1 end/cycle 2 start
TrP = Tear propagation resistance, pli
135B1 = Simulated blocking at 135C, pli Results in TABLE II above show far less blocking in the polyurethane sample prepared with hydroquinone bis(beta-hydroxyethyl)ether as the sole chain extender (Runs 2 and 3) or 1,4-butanediol as the sole chain extender (Run 4).

EXAMPLE 3

This example shows the use of a mixture of alkanediols versus use of the hydroxyl terminated polyester quinone bis(beta-hydroxyethyl)ether and 4,4'-diphenylmethane diisocyanate were reacted in the proportions shown in TABLE III below under the reaction conditions of Example 2 so as to give products of differing melt index.

Both test and comparison products were formed into films 0.030 inch thick and tested. Results are shown in TABLE III below.

TABLE III

| Run | Thermoplastic Polyurethane Compositions | | | | | |
|---|---|---|---|---|---|---|
| | 1 | 2 | 3 | A | B | C |
| Composition | | | | | | |
| Macroglycol (MG) | | | | | | |
| Alkanediol(s) | | C46 | | | C4 | |
| Acid | | C6 | | | C6 | |
| Mol. wt. | | | 2500 | | | |
| Blend MW | | | 1141 | | | |
| Chain ext. (CE) | | | BG | | | |
| CE/MG molar ratio | | | 1.44 | | | |
| NCO/OH Equiv. Ratio | 100 | 101 | 102 | 99 | 100 | 101 |
| Physical Properties | | | | | | |
| Melt index 210C/3800 g) | 60 | 33 | 20 | 68 | 38 | 16 |
| Hardness (Durometer A) | 76 | 77 | 77 | 77 | 77 | 78 |
| Transition Temps. (C.) | | | | | | |
| Soft Segment Tg | −32 | −33 | −37 | −32 | −32 | −33 |
| Hard Segment Tmm | 180 | 186 | 190 | 185 | 186 | 184 |
| Tensile | | | | | | |
| 100% Modulus, psi | 515 | 595 | 585 | 495 | 520 | 545 |
| 300% Modulus, psi | 820 | 995 | 995 | 1245 | 1405 | 1280 |
| Ultimate Ten, psi | 2700 | 3900 | 4100 | 2960 | 4950 | 5550 |

TABLE III-continued

| | Thermoplastic Polyurethane Compositions | | | | | |
|---|---|---|---|---|---|---|
| Run | 1 | 2 | 3 | A | B | C |
| Ult. Elong., % | 540 | 490 | 500 | 520 | 600 | 560 |
| Tear Prop. pli | 161 | 175 | 180 | 227 | 298 | 277 |
| Ext. Set C1/C2, % | 17/15 | 15/14 | 14/13 | 60/50 | 35/27 | 18/14 |
| 135C Sim. Blocking, pli | 8.9 | 5.0 | 4.4 | 9.4 | 5.3 | 2.8 |

The results in TABLE III show the superior extension set resistance and desirably flatter stress-strain response (less difference between 100% and 300% modulus) of the mixed polyester glycol system.

EXAMPLE 4

This example shows a preferred embodiment of this invention.

A mixed ethylene/hexamethylene (equimolar quantities) adipate polyester glycol having a molecular weight of 3200 was prepared under the reaction conditions of Example 1, but using an overall diol-to-acid molar ratio of 1.07. This mixed polyester, hydroquinone bis(beta-hydroxyethyl)ether and 4,4'-diphenylmethane diisocyanate were reacted in the proportions shown in TABLE IV below under the reaction conditions of Ex. 1. Three different melt indexes (molecular weights) were achieved by slight variation in the NCO/OH equivalent ratio.

TABLE IV

| Preferred Thermoplastic Polyurethane Compositions | | | |
|---|---|---|---|
| Run | 1 | 2 | 3 |
| Composition | | | |
| Macroglycol (MG) | | | |
| Alkanediols | | C26 | |
| Acid | | C6 | |
| Mol Wt. | | 3200 | |
| Chain Extgender | | BG | |
| CE/MG Molar Ratio | | 1.43 | |
| Blend MW | | 1434 | |
| NCO/OH Equiv. Ratio | 98.5 | 100 | 101 |
| Physical Properties | | | |
| Melt Index (210C/3800 g) | 58 | 36 | 14 |
| Hardness (Duro. A) | 72 | 72 | 72 |
| Transition Temps. °C. | | | |
| Soft Segment Tg | −37 | −33 | −32 |
| Hard Segment Tmm | 185 | 182 | 186 |
| Tensile | | | |
| 100% Modulus, psi | 405 | 450 | 480 |
| 300% Modulus, psi | 705 | 755 | 810 |
| Ult. Tensile, psi | 2700 | 3550 | 6300 |
| Ult. Elong., % | 640 | 640 | 630 |
| Extension Set C1/C2, % | 14/13 | 13/12 | 11/10 |
| Tear Propagation, pli | 159 | 196 | 172 |
| 135C Sim. Blocking, pli | 4.2 | 4.4 | 1.2 |

EXAMPLE 5

The procedure of Example 4 is followed except that the polyester is prepared from diethylene glycol, hexamethylene glycol and adipic acid. Similar results are obtained.

While in accordance with the patent statutes, a preferred embodiment and best mode has been presented, the scope of the invention is not limited thereto, but rather is measured by the scope of the attached claims.

What is claimed is:

1. An essentially linear film forming thermoplastic polyurethane elastomer comprising the reaction product of:
   (a) a random mixed hydroxyl terminated polyester of the formula (I)

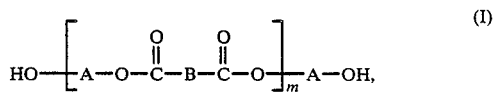

said polyester having a molecular weight of about 1800 to about 3600 and having essentially the structure of the reaction product of at least two straight chain aliphatic glycols containing from 2 to about 10 carbon atoms;
   (b) an aromatic glycol chain extender of the formula (II)

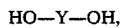

aliphatic diol chain extenders other than small adventitious amounts not exceeding 0.75 percent of the weight of said polyester (a) being absent, and
   (c) an isocyanate of the formula (III)

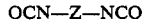

wherein
   (1) A is at least two alkylene radicals, oxydialkylene radicals or mixture thereof containing from 2 to about 10 carbon atoms, and B is an alkylene radical containing from 2 to about 10 carbon atoms or an arylene radical containing from 6 to about 12 carbon atoms or a mixture thereof,
   Y is a phenylenedialkylene or phenyleneoxyalkylene radical containing from about 8 to about 14 carbon atoms; and
   Z is a divalent organic radical;
   (2) The value of m is such that said polyester has a molecular weight from about 1800 to about 3600;
   (3) the molar ratio of said chain extender to said polyester is from about 0.75 to about 2;
   (4) the molar quantity of said isocyanate is substantially equal to the sum of the molar quantities of said polyester and said chain extender, and
   (5) said elastomer has a modulus at 100 percent elongation of 350 to 700 psi.

2. A polyurethane elastomer according to claim 1 wherein A is a mixture of alkylene radicals.

3. A polyurethane elastomer according to claim 1, said elastomer having alternating hard and soft segments wherein the hard segments comprise repeating groups of the formula IV

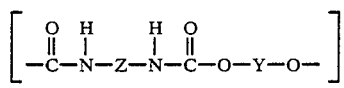

4. A polyurethane elastomer according to claim 1 wherein the molar ratio of said two aliphatic glycols is in the range of 90:10 to 10:90.

5. A polyurethane elastomer according to claim 4 wherein said aliphatic glycols are 1,4-butanediol and 1,6-hexanediol and said dicarboxylic acid is adipic acid.

6. A polyurethane elastomer according to claim 4 wherein said aliphatic glycols are ethylene glycol and 1,6-hexanediol and said dicarboxylic acid is adipic acid.

7. A polyurethane elastomer according to claim 1 wherein said chain extending agent is hydroquinone bis(beta-hydroxyethyl)ether.

8. A polyurethane elastomeric according to claim 1 wherein said polyester is the reaction product of ethylene glycol, 1,6-hexanediol and adipic acid, the chain extender is hydroquinone bis(betahydroxyethyl)ether and the diisocyanate is 4,4'diphenylmethane diisocyanate.

9. A polyurethane elastomer according to claim 1 wherein said polyester is the reaction product of 1,4-butanediol, 1,6-hexanediol and adipic acid, the chain extender is hydroquinone bis(betahydroxyethyl)ether and the diisocyanate is 4,4'-diphenylemethane diisocyanate.

10. A polyurethane elastomer according to claim 1 wherein said isocyanate is 4,4-diphenylmethane diisocyanate, 1,5-naththalene diisocyanate, meta-phenylene diisocyanate or para-phenylene diisocyanate.

11. A polyurethane elastomer according to claim 10 wherein said isocyanate is 4,4-diphenylmethane diisocyanate.

12. A thermoplastic polyurethane elastomer according to claim 1 having the following physical properties:
    (a) Simulated blocking at 135° C. of not over 10 pli without lubricant added;
    (b) Initial set after 200% extension of not over 25%; and
    (c) Tear propagation resistance of at least 150 pli.

13. A thermoplastic polyurethane elastomer according to claim 12, said elastomer also having the following physical properties:
    a Durometer "A" hardness of about 68 to about 84.

14. A polyurethane elastomer according to claim 1 wherein said dicarboxylic acid is an aliphatic dicarboxylic acid.

15. An essentially linear thermoplastic polyurethane elastomer comprising the reaction product of:
    (a) a random mixed hydroxyl terminated polyester of the formulas (I)

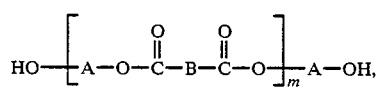

said polyester having a molecular weight of about 1800 to about 3600 and having essentially the structure of the reaction product of at least two straight chain aliphatic glycols containing from 2 to about 10 carbon atoms;
    (b) an aromatic glycol chain extender of the formula (II)

HO—Y—OH, aliphatic diol chain extenders other than small adventitious amounts not exceeding 0.75 percent of the weight of said polyester (a) being absent, and
    (c) an isocyanate of the formula (III)

OCN—Z—NCO wherein
(1) A is at least two alkylene radicals, oxydialkylene radicals or mixture thereof containing from 2 to about 10 carbon atoms, and B is an alkylene radical containing from 2 to about 10 carbon atoms or an arylene radical containing from 6 to about 12 carbon atoms or a mixture thereof,
Y is a phenylenedialkylene or phenyleneoxyalkylene radicals containing from about 8 to about 14 carbon atoms; and
Z is a divalent organic radical;
(2) the value of m is such that said polyester has a molecular weight from about 1800 to about 3600;
(3) the molar ratio of said chain extender to said polyester is from about 0.75 to about 2;
(4) the molar quantity of said isocyanate is substantially equal to the sum of the molar quantities of said polyester and said chain extender, and
(5) said elastomer has a modulus at 100 percent elongation of 350 to 700 psi,
said elastomer being in the form of a film.

16. A polyurethane elastomer film according to claim 15, said film being in the form of a strip.

17. A process for preparing an essentially linear film forming thermoplastic polyurethane elastomer having a modulus at 100 percent elongation of 350 to 700 psi, which comprises reacting:
    (a) a random mixed hydroxyl terminated polyester of the formula (I)

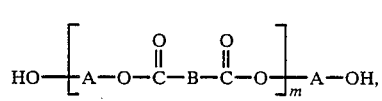

A is at least two alkylene radicals, oxydialkylene radicals or mixture thereof containing from 2 to about 10 carbon atoms,
B is an alkylene radical containing from 2 to about 10 carbon atoms or an arylene radical containing from 6 to about 12 carbon atoms or a mixture thereof, and
the value of m is such that said polyester has a molecular weight from about 1800 to about 3600; said polyester having a molecular weight of about 1800 to about 3600 and having essentially the structure of the reaction product of at least two straight chain aliphatic glycols containing from 2 to about 10 carbon atoms;
    (b) an aromatic glycol chain extender of the formula (II)

HO—Y—OH, wherein Y is a phenylendialkylene or phenyleneoxyalkylene radical containing from about 8 to about 14 carbon atoms, aliphatic diol chain extenders other than small adventitious amounts not exceeding 0.75 percent of the weight of said polyester (a) being absent; and (c) an isocyanate of the formula (III)

OCN—Z—NCO wherein

Z is a divalent organic radical;

the molar ratio of said chain extender to said polyester being from about 0.75 to about 2; and the molar quantity of said isocyanate being substantially equal to the sum of the molar quantities of said polyester and said chain extender, and recovering a thermoplastic polyurethane elastomer.

18. A process according to claim 17 wherein said polyester, said chain extender and said isocyanate are reacted in a single step.

* * * * *

UNITED STATES PATENT AND TRADEMARK OFFICE
CERTIFICATE OF CORRECTION

PATENT NO. : 4,877,856
DATED : October 31, 1989
INVENTOR(S) : Dale R. Hall, et al.

It is certified that error appears in the above-indentified patent and that said Letters Patent is hereby corrected as shown below:

In claim 1, column 14, line 28, delete the phrase --dicarboxylic acid and-- after the phrase "the reaction product of" which was inserted by Certificate of Correction. Instead, in claim 1, column 14, line 30, the phrase; with at least one dicarboxylic acid containing from 2 to about 12 carbon atoms;-- should be inserted after "atoms".

In claim 15, column 15, line 64, delete the phrase --dicarboxylic acid and-- after the phrase "the reaction product of" which was inserted by Certificate of Correction. Instead, in claim 15, column 16, line 66, the phrase --with at least one dicarboxylic acid containing from 2 to about 12 carbon atoms;-- should be inserted after "atoms".

In claim 17, column 16, line 57, delete the phrase --dicarboxylic acid and-- after the phrase "the reaction product of" which was inserted by Certificate of Correction. Instead, in claim 17, column 16, line 59, the phrase --with at least one dicarboxylic acid containing from 2 to about 12 carbon atoms;-- should be inserted after "atoms".

UNITED STATES PATENT AND TRADEMARK OFFICE
CERTIFICATE OF CORRECTION

PATENT NO. : 4,877,856
DATED : October 31, 1989
INVENTOR(S) : Dale R. Hall, et al.

It is certified that error appears in the above-indentified patent and that said Letters Patent is hereby corrected as shown below:

This certificate supersedes Certificate of Correction issued June 14, 1994.

Signed and Sealed this

Eleventh Day of July, 1995

Attest:

BRUCE LEHMAN

Attesting Officer      Commissioner of Patents and Trademarks